(12) United States Patent
Yu et al.

(10) Patent No.: US 8,351,729 B2
(45) Date of Patent: Jan. 8, 2013

(54) APPARATUS, METHOD, AND PROGRAM FOR IMAGE CORRECTION

(75) Inventors: Shanshan Yu, Kawasaki (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 434 days.

(21) Appl. No.: 12/750,138

(22) Filed: Mar. 30, 2010

(65) Prior Publication Data

US 2010/0183239 A1    Jul. 22, 2010

Related U.S. Application Data

(63) Continuation of application No. PCT/JP2007/071576, filed on Nov. 6, 2007.

(51) Int. Cl.
*G06K 9/40* (2006.01)
(52) U.S. Cl. ........................................................ 382/263
(58) Field of Classification Search .................. None
See application file for complete search history.

(56) References Cited

U.S. PATENT DOCUMENTS

| 5,317,427 | A  | * | 5/1994 | Ichikawa ........................ 358/520 |
| 7,057,766 | B1 |   | 6/2006 | Inoue |
| 2001/0007599 | A1 | | 7/2001 | Iguchi et al. |
| 2006/0104507 | A1 | * | 5/2006 | John ............................ 382/167 |

FOREIGN PATENT DOCUMENTS

| JP | 2001-034748 | 2/2001 |
| JP | 2001-186369 | 7/2001 |
| JP | 2001-189863 | 7/2001 |
| JP | 2002-262122 | 9/2002 |
| JP | 2003-523110 | 7/2003 |
| JP | 2005-318137 | 11/2005 |
| JP | 2007-028244 | 2/2007 |
| JP | 2007-243883 | 9/2007 |
| WO | WO 01/59183 A2 | 8/2001 |

* cited by examiner

*Primary Examiner* — Alex Liew
(74) *Attorney, Agent, or Firm* — Greer, Burns & Crain, Ltd.

(57) ABSTRACT

To perform image correction according to the features of an input image and output a fine and conspicuous image corresponding to a variety of scenes; an image correcting apparatus detects, from the pixels of the input image, the dark pixels that have the respective pixel values equal to or smaller than a first threshold value. Then, for each dark pixel having the pixel value equal to or smaller than the first threshold value, the image correcting apparatus detects calculates the shading variation between the dark pixel and the corresponding surrounding pixels, calculates a correction amount based on the calculated shading variation, and performs image correction with the calculated correction amount.

12 Claims, 8 Drawing Sheets

| SHADING VARIATION B | 0.0 TO 3.9 | 4.0 TO 6.9 | 7.0 TO 9.9 | 10.0 TO 15.9 | 16.0 TO 20.9 | 21.0 TO 25.9 | 26.0 ONWARD |
|---|---|---|---|---|---|---|---|
| SELECTED CURVE | 1 | 2 | 3 | 4 | 5 | 6 | 7 |

$$A = -\sum_{i=0}^{Thi} p_i \log p_i$$

AT THIS TIME, A=B

APPARATUS, METHOD, AND PROGRAM FOR IMAGE CORRECTION

CROSS-REFERENCE TO RELATED APPLICATION

This application is a continuation of International Application No. PCT/JP2007/071576, filed on Nov. 6, 2007, the entire contents of which are incorporated herein by reference.

FIELD

The embodiments discussed herein are directed to an image correcting apparatus, an image correcting method, and an image correcting program for performing correction according to the characteristics of an input image and outputting a fine and conspicuous image corresponding to a variety of scenes.

BACKGROUND

Typically, image correction for correcting an input image such as a moving image or a still image is performed according to the characteristics of the input image so that a fine and conspicuous image can be output corresponding to a variety of scenes. More particularly, in the case of performing color correction of an input image by determining a color correction amount from the luminance (or brightness) of the input image, an image correcting apparatus is known that performs uniform luminance correction over the entire image by brightening dark portions and darkening bright portions. Various image correcting apparatuses have been disclosed for outputting a fine and conspicuous image corresponding to a variety of scenes.

For example, Japanese Laid-open Patent Publication No. 2003-523110 discloses an image correcting apparatus that performs, with reference to a histogram, localized adjustments in an image by brightening dark portions and darkening bright portions based on a pixel property that is a locally-measured image correction amount. Further, Japanese Laid-open Patent Publication No. 2005-318137 discloses an image correcting apparatus that splits a single image into a plurality of regions depending on the luminance, detects edges or high-frequency components in the dark portions and the bright portions in each region, and performs localized color correction.

However, in the case of implementing a conventional technology, there is occurrence of a black floating phenomenon in which the black color is perceived as the white color or a black defacement phenomenon in which a dark image becomes darker and less viewable. Besides, the implementation cost is high and it is not possible to perform high-speed processing in real time.

More particularly, while performing localized color correction as described in Japanese Laid-open Patent Publication No. 2003-523110 or Japanese Laid-open Patent Publication No. 2005-318137, a black floating phenomenon or a black defacement phenomenon occurs because it is not possible to distinguish whether, in a dark image, the dark portion falls within the range that is to be improved visually. Moreover, while performing different correction for each region as described in Japanese Laid-open Patent Publication No. 2005-318137, the processing becomes complex thereby causing an increase in the cost and making it difficult to perform high-speed processing in real time.

SUMMARY

According to an aspect of an embodiment of the invention, an image correcting apparatus for performing correction according to a feature of an input image, includes a dark-portion-pixel detecting unit that detects, from each pixel of the input image, a pixel having corresponding pixel value equal to or smaller than a first threshold value; a dark-portion shading-variation calculating unit that calculates, for each pixel that is detected by the dark-portion-pixel detecting unit to be a dark pixel having corresponding pixel value equal to or smaller than the first threshold value, a shading variation between the dark pixel and corresponding surrounding pixel; and a correction amount calculating unit that calculates a correction amount based on the shading variation calculated by the dark-portion shading-variation calculating unit and performs image correction with the correction amount.

According to another aspect of an embodiment of the invention, an image correcting method for performing correction according to a feature of an input image, includes detecting, from each pixel of the input image, a pixel having corresponding pixel value equal to or smaller than a first threshold value; calculating, for each pixel that is detected at the detecting to be a dark pixel having corresponding pixel value equal to or smaller than the first threshold value, a shading variation between the dark pixel and corresponding surrounding pixel; and calculating a correction amount based on the shading variation calculated at the calculating the shading variation and performing image correction with the correction amount.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. The following description includes the explanation in order about an outline, features, a configuration, and a sequence of operations of an image correcting apparatus according to a first embodiment followed by the explanation about effects of the first embodiment.

[a] First Embodiment

Outline and Features of Image Correcting Apparatus

Figure 1:
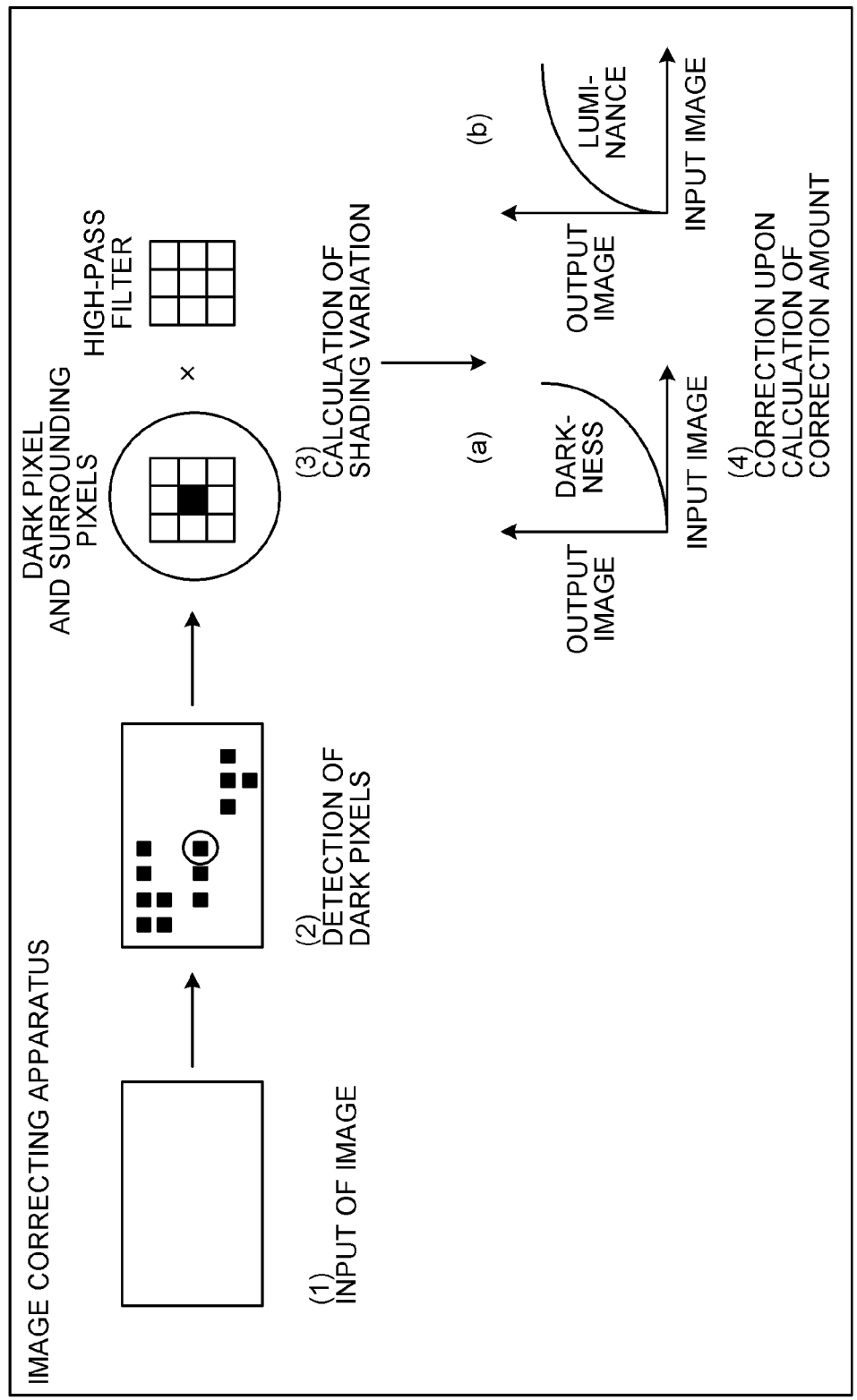
FIG. 1 is a schematic diagram for explaining an outline and features of an image correcting apparatus according to a first embodiment.

Explained below are an outline and features of the image correcting apparatus according to the first embodiment. FIG. 1 is a schematic diagram for explaining an outline and features of the image correcting apparatus according to the first embodiment.

Generally, while performing image correction, the visual compactness or firmness of an image is influenced by the manner in which the black portion in the image is output. The image correction apparatus according to the first embodiment performs correction according to the characteristics of an input image such as a moving image or a still image and outputs a fine and conspicuous image corresponding to a variety of scenes.

Thus, as an outline in this case, the image correction apparatus performs correction according to the characteristics of an input image. Moreover, as main features, the image correcting apparatus prevents occurrence of a black floating phenomenon or a black defacement phenomenon and performs high-speed processing in real time and in an economical manner.

Regarding the main features, the image correcting apparatus stores therein, in a corresponding manner to the shading (or gray scale) variation that is calculated, two types of correction curves that are used in correction amount determination. More particularly, the image correcting apparatus stores therein a correction curve (a) in FIG. 1 that is used to darken an input image as correction and a correction curve (b) in FIG. 1 that is used to brighten an input image as correction.

In the above condition, the image correcting apparatus detects, from all pixels of an input image, the pixels that have the respective pixel values equal to or smaller than a first threshold value (see (1) and (2) in FIG. 1). As a specific example, upon receiving the input of a moving image or a still image, the image correction apparatus calculates, as luminance, the pixel value of each pixel in the input image and compares the calculated luminance of each pixel with the first threshold value (e.g., 50). If the pixel value of a particular pixel is equal to or smaller than 50, then the image correcting apparatus detects that pixel to be a dark pixel. On the other hand, if the pixel value of a particular pixel is greater than 50, then the image correcting apparatus considers that particular pixel as a bright pixel, outputs that pixel without performing any processing thereon, and proceeds to the processing of the subsequent pixel.

Subsequently, for each detected dark pixel having the pixel value equal to or smaller than the first threshold value, the image correcting apparatus calculates the shading variation between the dark pixel and the corresponding surrounding pixels (see (3) in FIG. 1). More particularly, in the abovementioned example, for each detected dark pixel having the luminance equal to or smaller than 50, the image correcting apparatus first performs multiplication operation of a pixel set including the dark pixel and eight surrounding pixels by using the values at corresponding positions of a 3×3 high-pass filter. Then, the image correcting apparatus calculates the sum of the multiplication result as the shading variation between the dark pixel and the eight surrounding pixels and obtains the total sum of the shading variation for all dark pixels as the shading variation (e.g., 100) in the entire image.

Based on the shading variation in the entire image, the image correcting apparatus calculates the correction amount and corrects the image with that correction amount (see (4) in FIG. 1). More particularly, in the abovementioned example, the image correcting apparatus compares the shading variation (e.g., 100) in the image with a predetermined threshold value (e.g., 120). If the shading variation (100) in the image is equal to or smaller than the predetermined threshold value (120), then the image correcting apparatus obtains the correction curve that is used to darken an input image as correction (see (a) in FIG. 1). On the other hand, if the shading variation (100) in the image is greater than the predetermined threshold value (120), then the image correcting apparatus obtains the correction curve that is used to brighten an input image as correction (see (b) in FIG. 1). Then, the image correcting apparatus calculates the correction amount according to the obtained correction curve and performs image correction with the correction amount.

In this way, the image correcting apparatus according to the first embodiment does not just brighten the dark portion in an image. Instead, the image correcting apparatus determines the correction amount on the basis of the shading variation between each dark pixel and the corresponding surrounding pixels in an image and appropriately performs image correction with the correction amount. Besides, since image correction can be performed by making use of the shading variation obtained for each dark pixel and without having to perform any complicated operations, it becomes possible to prevent occurrence of a black floating phenomenon or a black defacement phenomenon and perform high-speed processing in real time and in an economical manner.

Configuration of Image Correcting Apparatus

Figure 2:
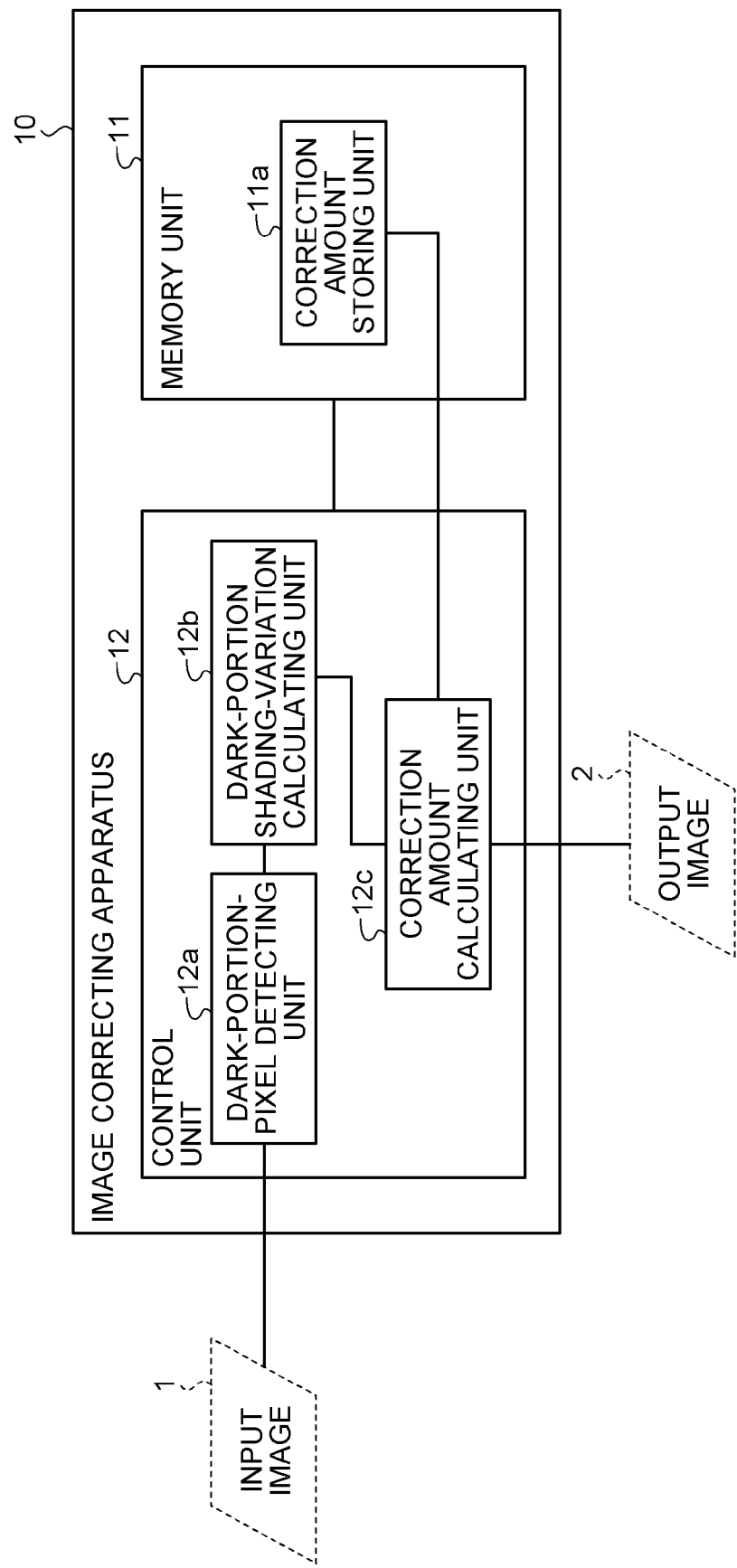
FIG. 2 is a block diagram of a configuration of the image correcting apparatus according to the first embodiment.

Given below is the description with reference to FIG. 2 of a configuration of the image correcting apparatus according to the first embodiment. FIG. 2 is a block diagram of a configuration of the image correcting apparatus according to the first embodiment. As illustrated in FIG. 2, an image correcting apparatus 10 includes a memory unit 11 and a control unit 12. The image correcting apparatus 10 performs correction according to the characteristics of an input image and then outputs an output image.

The memory unit 11 is used to store the data required in a variety of processing performed by the control unit 12 or store a variety of processing results obtained by the control unit 12. Particularly, as a constituent element of close association with the present embodiment, the memory unit 11 includes a correction amount storing unit 11a.

Figure 3:
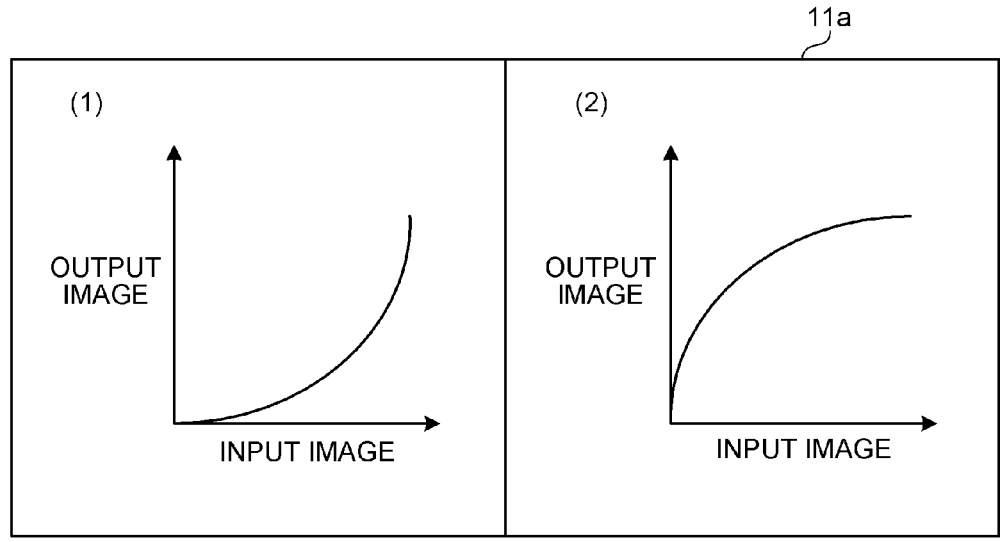
FIG. 3 is a schematic diagram of exemplary information stored in a correction amount storing unit.

The correction amount storing unit 11a stores therein the two types of correction curves that are used for correction of an image input to the image correcting apparatus 10. For example, as illustrated in FIG. 3, the correction amount storing unit 11a stores therein, in a corresponding manner to the shading variation calculated by a dark-portion shading-variation calculating unit 12b described later, a correction curve for darkening an input image (see (1) in FIG. 3) and a correction curve for brightening an input image (see (2) in FIG. 3) that are used while determining the correction amount. Herein, FIG. 3 is a schematic diagram of exemplary information stored in the correction amount storing unit 11a.

The control unit 12 includes an internal memory for storing control programs, programs that define a variety of processing sequences, and necessary data. Particularly, as a constituent element of close association with the present embodiment, the control unit 12 includes a dark-portion-pixel detecting unit 12a, the dark-portion shading-variation calculating unit 12b, and a correction amount calculating unit 12c. The control unit 12 performs a variety of operations using these constituent elements.

The dark-portion-pixel detecting unit 12a detects, from all pixels of an input image, the pixels that have the respective pixel values equal to or smaller than the first threshold value. As a specific example, upon receiving an image such as a moving image or a still image input to the image correcting apparatus 10, the dark-portion-pixel detecting unit 12a calculates, as luminance, the pixel value of each pixel in the input image and compares the luminance of each pixel with the first threshold value (e.g., 50). If the pixel value of a particular pixel is equal to or smaller than 50, then the dark-portion-pixel detecting unit 12a detects that pixel to be a dark pixel and outputs it to the dark-portion shading-variation calculating unit 12b described later. On the other hand, if the pixel value of a particular pixel is greater than 50, then the dark-portion-pixel detecting unit 12a considers that particular pixel as a bright pixel, outputs that pixel without performing any processing thereon, and proceeds to the processing of the subsequent pixel.

Figure 4:
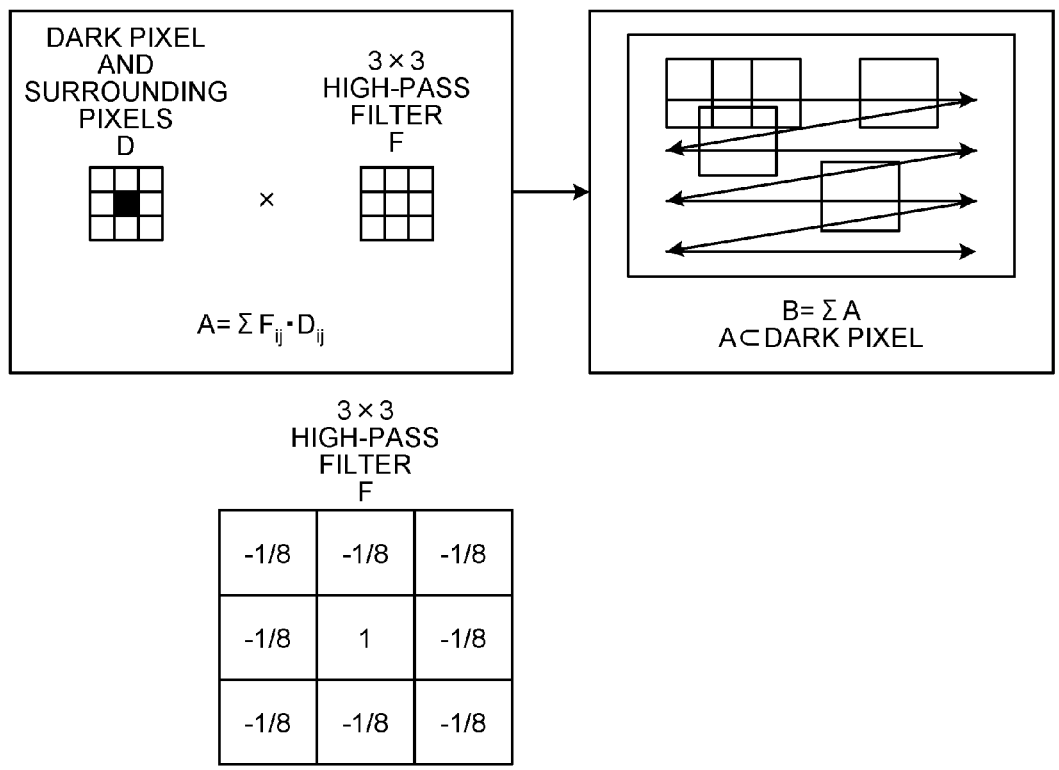
FIG. 4 is a schematic diagram for explaining the operation performed by a dark-portion shading-variation calculating unit according to the first embodiment using a 3×3 high-pass filter.

Subsequently, for each detected dark pixel having the pixel value equal to or smaller than the first threshold value, the dark-portion shading-variation calculating unit 12b calculates the shading variation between the dark pixel and the corresponding surrounding pixels. More particularly, in the abovementioned example as depicted in FIG. 4, for each detected dark pixel having the luminance equal to or smaller than 50, the dark-portion shading-variation calculating unit 12b first performs multiplication operation of a pixel set D including the dark pixel and eight surrounding pixels by using the values at corresponding positions of a 3×3 high-pass filter F (i.e., calculation of $F_{ij} \times D_{ij}$). Then, the dark-portion shading-variation calculating unit 12b calculates a sum A of the calculation result (i.e., $A = \Sigma F_{ij} \times D_{ij}$) as the shading variation between the dark pixel and the eight surrounding pixels. Subsequently, the dark-portion shading-variation calculating unit 12b calculates the shading variation (e.g., 100) in the entire image by obtaining the total sum of the calculated shading variation for all pixels ($B = \Sigma A$), and outputs it to the correction amount calculating unit 12c.

That is, for each dark pixel detected by the dark-portion-pixel detecting unit 12a, the dark-portion shading-variation calculating unit 12b performs the operation of passing the pixel set including the dark pixel and the corresponding surrounding pixels through a high-pass filter to obtain the shading variation between the dark pixel and the corresponding surrounding pixels and then adding all the shading variation to calculate the shading variation in the entire input image. FIG. 4 is a schematic diagram for explaining the operation performed by the dark-portion shading-variation calculating unit 12b according to the first embodiment using a 3×3 high-pass filter. Each numerical value in the 3×3 high-pass filter F illustrated in FIG. 4 is an example of the difference in the shading variation between a dark pixel and the corresponding surrounding pixels. The 3×3 high-pass filter F indicates that, for example, for a single dark pixel, the difference in the surrounding shading variation is ⅛.

Based on the calculated shading variation in the image, the correction amount calculating unit 12c calculates the correction amount and performs image correction with the calculated correction amount. More particularly, in the abovementioned example, the correction amount calculating unit 12c compares the shading variation (100) in the image calculated by the dark-portion shading-variation calculating unit 12b with a predetermined threshold value (e.g., 120). If the shading variation (100) in the image is equal to or smaller than the predetermined threshold value (120), then the correction amount calculating unit 12c obtains the correction curve for darkening an input image (see (1) in FIG. 3) from the correction amount storing unit 11a. On the other hand, if the shading variation (100) in the image is greater than the predetermined threshold value (120), then the image correcting apparatus obtains the correction curve for brightening an input image (see (2) in FIG. 3) from the correction amount storing unit 11a. Then, the correction amount calculating unit 12c calculates the correction amount according to the obtained correction curve, performs image correction with the correction amount, and outputs the corrected image.

Operation in Image Correcting Apparatus According to First Embodiment

Figure 5:
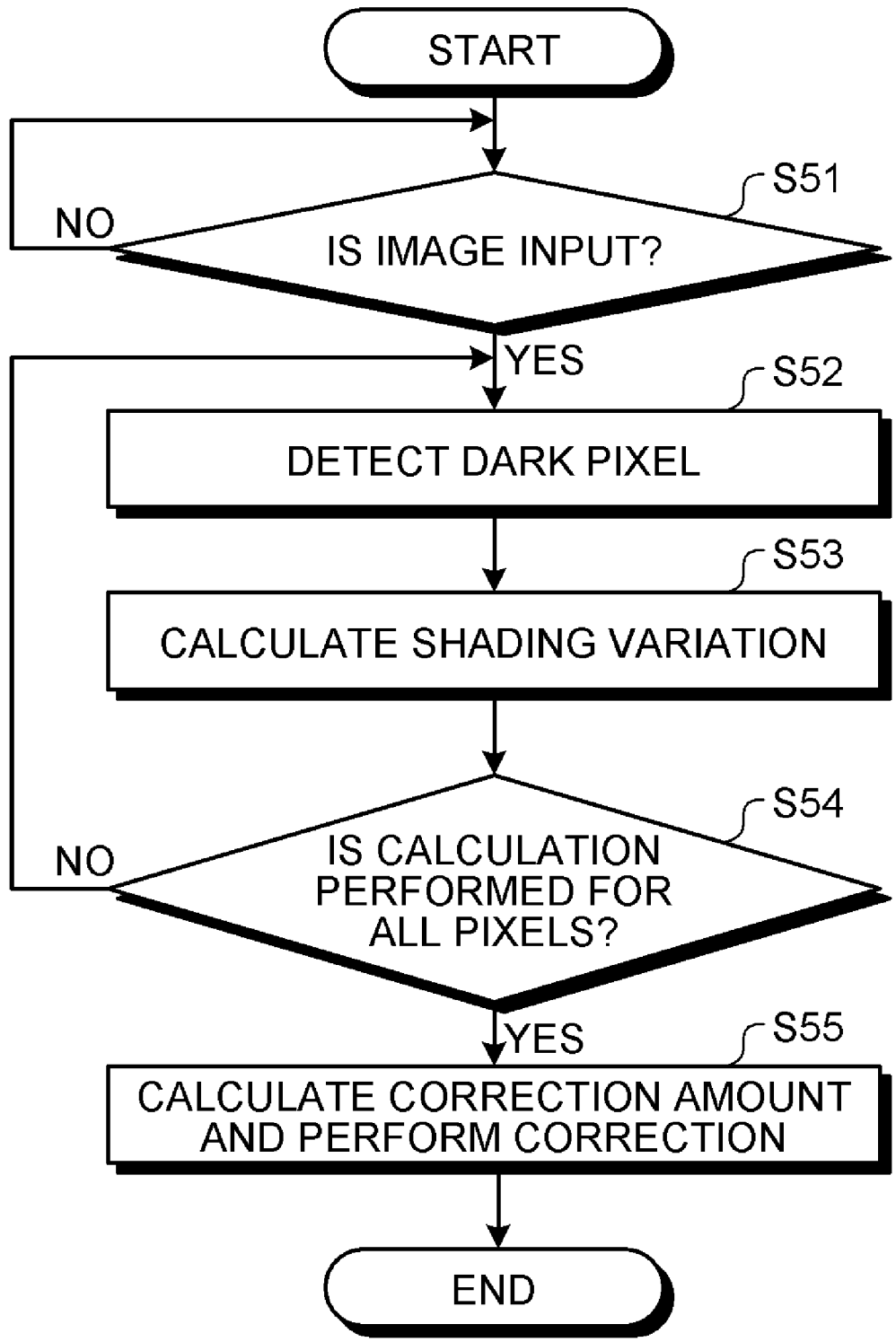
FIG. 5 is a flowchart for explaining an image correcting operation performed by the image correcting apparatus according to the first embodiment.

Given below is the description with reference to FIG. 5 about an image correcting operation performed by the image correcting apparatus 10 according to the first embodiment. FIG. 5 is a flowchart for explaining an image correcting operation performed by the image correcting apparatus 10 according to the first embodiment.

As illustrated in FIG. 5, upon receiving the input of an image in the image correcting apparatus 10 (Yes at Step S51), the dark-portion-pixel detecting unit 12a detects, from all pixels in the input image, the pixels that have the respective pixel values equal to smaller than the first threshold value (Step S52). As a specific example, upon receiving the input of a moving image or a still image, the dark-portion-pixel detecting unit 12a detects, as dark pixels, the pixels that have the respective luminance equal to or smaller than the first threshold value and outputs the dark pixels to the dark-portion shading-variation calculating unit 12b.

Subsequently, for each dark pixel that is detected by the dark-portion-pixel detecting unit 12a to have the luminance equal to or smaller than the first threshold value, the dark-portion shading-variation calculating unit 12b calculates the shading variation between the dark pixel and the corresponding surrounding pixels (Step S53). More particularly, in the abovementioned example, for each dark pixel that is detected by the dark-portion-pixel detecting unit 12a to have the luminance equal to or smaller than the first threshold value, the dark-portion shading-variation calculating unit 12b performs multiplication operation of a pixel set including the dark pixel and eight surrounding pixels by using the values at corresponding positions of a 3×3 high-pass filter, calculates the shading variation between the dark pixel and the eight surrounding pixels as the sum of the multiplication result, and obtains the total sum of the shading variation for all pixels as the shading variation in the entire image.

When the dark-portion shading-variation calculating unit 12b calculates the shading variation for each pixel (Yes at Step S54), the correction amount calculating unit 12c calculates the correction amount based on the calculated shading variation and performs image correction with the calculated correction amount (Step S55). More particularly, in the abovementioned example, the correction amount calculating unit 12c compares the total sum of the shading variation for all pixels calculated by the dark-portion shading-variation calculating unit 12b with a predetermined threshold value. If the total sum of the shading variation is equal to or smaller than the predetermined threshold value, then the correction amount calculating unit 12c obtains the correction curve for darkening an input image from the correction amount storing unit 11a. On the other hand, if the total sum of the shading variation is greater than the predetermined threshold value, then the correction amount calculating unit 12c obtains the correction curve for brightening an input image from the correction amount storing unit 11a. Then, the correction amount calculating unit 12c calculates the correction amount according to the obtained correction curve, performs image correction with the correction amount, and outputs the corrected image.

Effects of First Embodiment

In this way, the image correcting apparatus 10 detects, from all pixels of an input image, the dark pixels that have the respective pixel values equal to or smaller than the first threshold value. For each dark pixel having the pixel value equal to smaller than the first threshold value, the image correcting apparatus 10 calculates the shading variation between the dark pixel and the corresponding surrounding pixels and calculates the correction amount based on the calculated shading variation. The image correcting apparatus 10 then performs image correction with the calculated correction amount. That enables preventing the occurrence of a black floating phenomenon or a black defacement phenomenon and performing high-speed processing in real time and in an economical manner.

For example, in order to perform image correction according to the characteristics of an input image and output a fine and conspicuous image corresponding to a variety of scenes, the image correcting apparatus 10 detects the dark pixels from the input image, determines the correction amount based on the shading variation between each dark pixel and the corresponding surrounding pixels, and performs image correction with the correction amount. That is, since it is possible to easily calculate the shading variation for the dark portion in an image and then perform image correction by taking into consideration the calculated shading variation, the occurrence of a black floating phenomenon or a black defacement phenomenon may be prevented and high-speed processing may be performed in real time and in an economical manner.

Moreover, since the image correcting apparatus 10 makes use of a high-pass filter for calculating the shading variation between the dark pixels and the respective surrounding pixels; it becomes possible to output a fine and conspicuous image corresponding to a variety of scenes.

Furthermore, since the image correcting apparatus 10 makes use of the shading variation in an entire image to calculate the correction amount for darkening or brightening the image; it becomes possible to output a fine and conspicuous image corresponding to a variety of scenes.

Meanwhile, in the first embodiment, the description is given about the case when dark pixels are detected from all pixels of an input image and image correction is performed by calculating the shading variation. However, the present invention is not limited to that case. That is, alternatively, it is also possible to perform the process of detecting dark pixels from all pixels of an input image and performing image correction by calculating the shading variation only if that input image is a dark image. Regarding that case, while omitting the explanation of the operations identical to that in the abovementioned first embodiment, the description below is given about determining whether an input image is a bright image or a dark image and performing an image correcting operation only if the input image is determined to be a dark image.

Detection of Dark Pixels from a Dark Image

Figure 6:
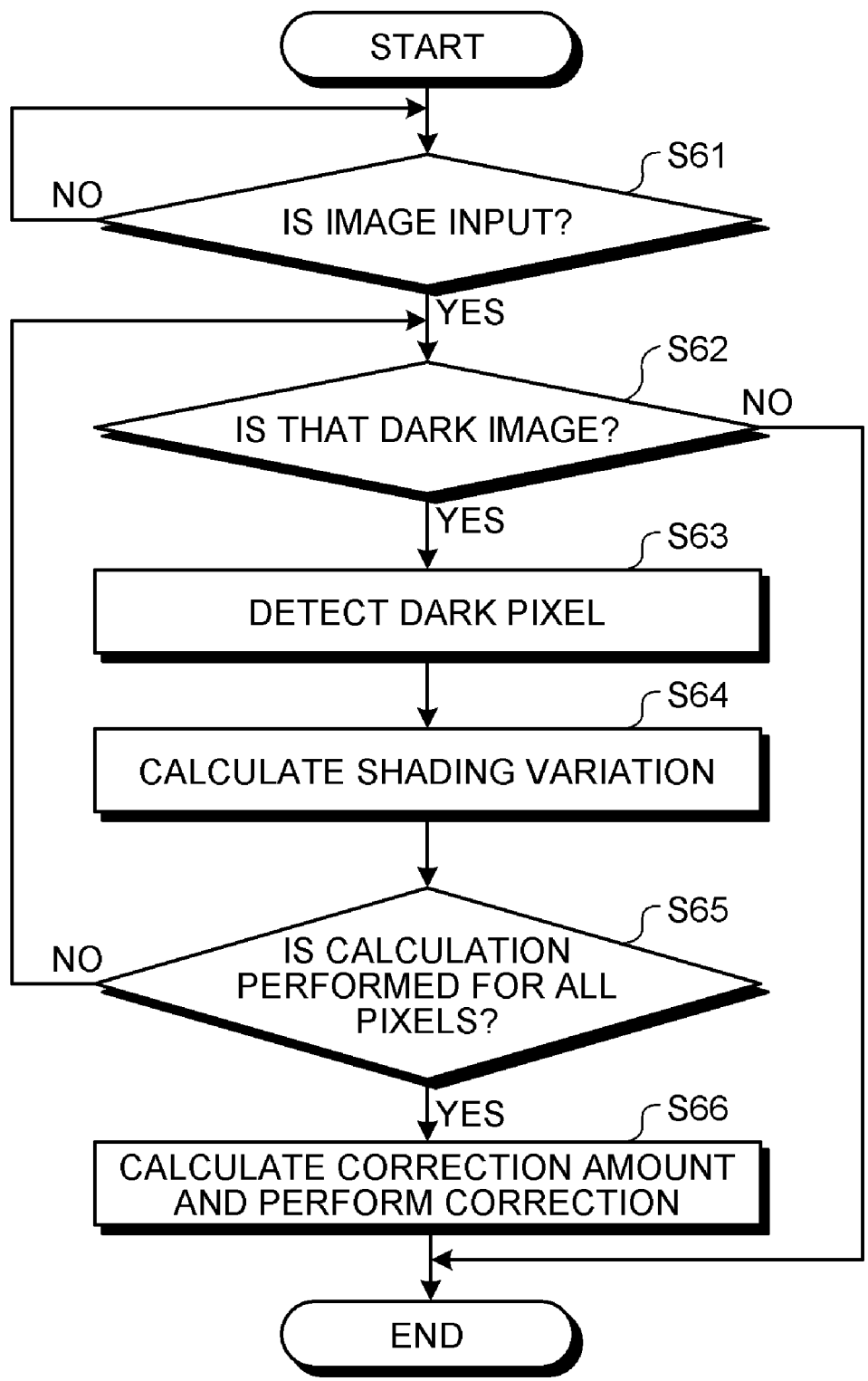
FIG. 6 is a flowchart for explaining an image correcting operation that includes the determination of whether an input image is a dark image.

Given below is the description with reference to FIG. 6 about an image correcting operation that includes the determination of whether an input image is a dark image. FIG. 6 is a flowchart for explaining an image correcting operation that includes the determination of whether an input image is a dark image.

As illustrated in FIG. 6, upon receiving the input of an image in the image correcting apparatus 10 (Yes at Step S61), the image correcting apparatus 10 calculates a feature value of average luminance from the pixel values of all pixels in the input image and determines whether the feature value of average luminance of the input image is equal to or smaller than a second threshold value (Step S62). More particularly, upon receiving the input of a moving image or a still image, the image correction apparatus 10 calculates a feature value of average luminance from the pixel values of all pixels in the input image. The feature value of average luminance corresponds to, for example, the average luminance or the mode value of luminance. Then, the image correcting apparatus 10 determines whether the luminance of the input image, which is, for example, the average of the luminance of all calculated pixels, is equal to or smaller than the second threshold (e.g. 50). If the luminance of the input image is equal to or smaller than 50, then the image correcting apparatus 10 detects, as dark pixels, the pixels that have the respective luminance, that is, the respective pixel values equal to or smaller than the first threshold value (e.g., 50).

Subsequently, in an identical manner to Steps S52 to S55 illustrated in FIG. 5, the image correcting apparatus 10 performs the operations of detecting the dark pixels, calculating the shading variation for the detected dark pixels, and performing image correction with a correction amount that is calculated using the shading variation from Step S63 to Step S66. Hence, the details of those operations are not repeated.

Thus, instead of detecting the dark pixels from all pixels of input images, the image correcting apparatus 10 detects the dark pixels from pixels of only the dark images. That makes it possible to reduce the number of pixels to be processed as compared to the case when the dark pixels are detected from all pixels of input images. As a result, it becomes possible to reduce the processing load.

[b] Second Embodiment

In the first embodiment, the image correcting apparatus 10 stores therein only two types of correction curves that are used in correcting an input image. However, the present invention is not limited to that case. Alternatively, it is also possible to store, in a corresponding manner to the shading variation, a plurality of correction curves used in correction amount determination and perform image correction using a correction curve that corresponds to the calculated shading variation.

Image Correcting Operation According to Second Embodiment

Figure 7:
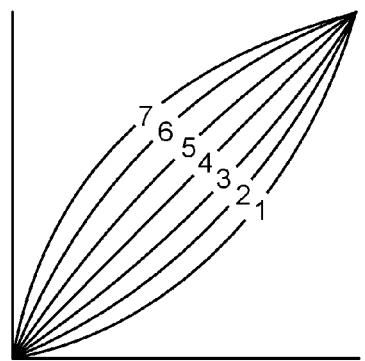
FIG. 7 is a schematic diagram for explaining an image correcting operation performed by an image correcting apparatus according to a second embodiment.

Given below is the description with reference to FIG. 7 of the image correcting operation performed by the image correcting apparatus 10 according to a second embodiment. FIG. 7 is a schematic diagram for explaining the image correcting operation performed by the image correcting apparatus 10 according to the second embodiment. Herein, since the operation of calculating the shading variation in an input image is identical to that described in the abovementioned first embodiment, the details thereof are not repeated. The following description is given for a case when seven correction curves (correction curves 1 to 3 for brightening, correction curves 5 to 7 for darkening, correction curve 4 for no correction) are stored for correction amount determination.

The difference with the first embodiment is that each of the plurality of correction curves is stored in a corresponding manner with a shading variation. More particularly, as illustrated in FIG. 7, the correction curve 1 is stored in a corresponding manner with a shading variation B in the range of 0.0 to 3.9, the correction curve 2 is stored in a corresponding manner with the shading variation B in the range of 4.0 to 6.9, the correction curve 3 is stored in a corresponding manner with the shading variation B in the range of 7.0 to 9.9, the correction curve 4 is stored in a corresponding manner with the shading variation B in the range of 10.0 to 15.9, the correction curve 5 is stored in a corresponding manner with the shading variation B in the range of 16.0 to 20.9, the correction curve 6 is stored in a corresponding manner with the shading variation B in the range of 21.0 to 25.9, and the correction curve 7 is stored in a corresponding manner with the shading variation B of 26.0 onward.

For example, for an image, if the shading variation B calculated by the dark-portion shading-variation calculating unit 12b is 6.7; then the image correcting apparatus 10 obtains the correction curve 2, which corresponds to the shading variation B of 6.7 as illustrated in FIG. 7, from the correction amount storing unit 11a, calculates the correction amount according to the correction curve 2, and performs image correction with the calculated correction amount. Moreover, if, for an image, the shading variation B calculated by the dark-portion shading-variation calculating unit 12b is, for example, 20; then the image correcting apparatus 10 obtains the correction curve 5, which corresponds to the shading variation B of 20 as illustrated in FIG. 7, from the correction amount storing unit 11a, calculates the correction amount according to the correction curve 5, and performs image correction with the calculated correction amount.

Effects of Second Embodiment

In this way, the image correcting apparatus 10 stores therein, in a corresponding manner to the calculated shading variation, a plurality of correction curves used in correction amount determination, obtains the correction amount corresponding to the calculated shading variation from one of the stored correction curves, and performs image correction with the correction amount. That makes it possible to accurately perform correction of an image corresponding to a variety of scenes having different shading variation.

That is, depending on the shading variation, the image correcting apparatus 10 performs image correction by selecting a correction amount from a plurality of correction amounts. Thus, as compared to the case when a certain correction amount is selected depending on whether the shading variation is greater or smaller than the predetermined threshold value, it becomes possible to accurately perform image correction corresponding to a variety of scenes having different shading variation.

[c] Third Embodiment

In the first two embodiments, the shading variation B is calculated using a high-pass filter. However, the present invention is not limited to that case. That is, the shading variation may also be calculated with various other methods. In a third embodiment, two calculation methods for calculating the shading variation are explained: first is a calculation method using a histogram and second is a calculation method using the difference between a dark pixel and the corresponding previous pixel.

Calculation Method Using Histogram

Figure 8:
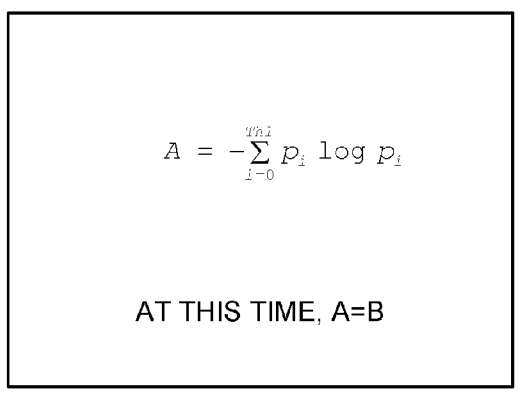
FIG. 8 is a schematic diagram for explaining a case of calculating shading variation using a histogram of an image.

FIG. 8 is a schematic diagram for explaining the case of calculating the shading variation using the histogram of an image. In FIG. 8, A represents entropy of the dark portion in an image, Th1 represents a predetermined threshold value, $p_i$ represents the probability of a pixel value i. The shading variation B is calculated by obtaining the value of A (A=B). For example, for Th1=50, the image correcting apparatus 10 aggregates the multiplication value of the probability $p_i$ (determined from the ratio of numerical values of pixel values and total number of pixels) of the pixel value i (luminance value) and the logarithm of $p_i$ (where the pixel value i is in the range of 0 to 50) and calculates the value of A as illustrated in FIG. 8.

Figure 9:
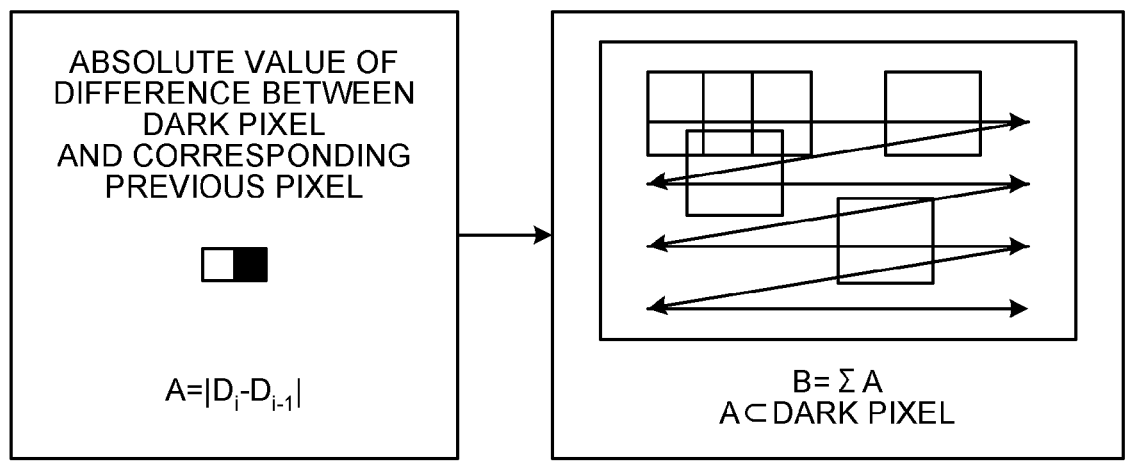
FIG. 9 is a schematic diagram for explaining a case of calculating shading variation using the difference between a dark pixel and the corresponding previous pixel.

Calculation Method Using Difference Between Dark Pixel and Corresponding Previous Pixel FIG. 9 is a schematic diagram for explaining the case of calculating the shading variation using the difference between a dark pixel and the corresponding previous pixel. As illustrated in FIG. 9, for example, for each detected dark pixel, the image correcting apparatus 10 calculates the absolute value ($A=|D_i-D_{i-1}|$) of the difference between the dark pixel and the corresponding previous pixel. Then, the image correcting apparatus 10 calculates the total sum of the absolute values of the differences between the dark pixels and the respective previous pixels as the shading variation B (B=ΣA).

[d] Fourth Embodiment

Apart from the abovementioned embodiments of the present invention, the present invention can also be implanted using various other embodiments. Herein, other embodiments are explained by dividing the description into (1) obtaining correction curves using the average of shading variation, (2) calculating correction curves using the average of shading variation, (3) system configuration, and (4) computer program.

(1) Obtaining Correction Curves Using the Average of Shading Variation

In the first three embodiments, the correction curves are obtained from the calculated shading variation. However, the present invention is not limited to that case and it is also possible to obtain the correction curves from the average of the shading variation.

For example, the image correcting apparatus 10 compares the average (shading variation÷number of dark pixels) of the shading variation (100) with a predetermined threshold value (e.g., 10). If the average of the shading variation (100÷15=6.7, where 15 is the number of dark pixels) is equal to or smaller than the predetermined threshold value (10), then the image correcting apparatus 10 obtains the correction curve for darkening an image (see (1) in FIG. 3) from the correction amount storing unit 11a, calculates the correction amount according to the correction curve, and performs image correction with the correction amount. On the other hand, if the average of the shading variation (100÷5=20, where 5 is the number of dark pixels) is greater than the predetermined threshold value (10), then the image correcting apparatus 10 obtains the correction curve for brightening an image (see (2) in FIG. 3) from the correction amount storing unit 11a, calculates the correction amount according to the correction curve, and performs image correction with the correction amount.

Meanwhile, if the shading variation B illustrated in FIG. 7 is assumed to be the average value of the shading variation B and if, for example, the shading variation B calculated by the dark-portion shading-variation calculating unit 12b is 100 and the number of dark pixels is 15; then the image correcting apparatus 10 obtains from the correction amount storing unit 11a the correction curve 2 that corresponds to the average of the shading variation B (100÷15=6.7), calculates the correction amount according to the correction curve 2, and performs image correction with the calculated correction amount. If, for example, the shading variation B calculated by the dark-portion shading-variation calculating unit 12b is 100 and the number of dark pixels is 5; then the image correcting apparatus 10 obtains from the correction amount storing unit 11a the correction curve 5 that corresponds to the average of the shading variation B (100÷5=20), calculates the correction amount according to the correction curve 5, and performs image correction with the calculated correction amount.

(2) Calculating Correction Curves Using the Average of Shading Variation

In the first three embodiments, a correction curve is obtained from the calculated shading variation. However, the present invention is not limited to that case and it is also possible to calculate a correction curve from the average of shading variation.

For example, with the shading variation B calculated by the dark-portion shading-variation calculating unit 12b, the image correcting apparatus 10 calculates a correction curve (y=α-power of x (exponent function)) using the average of shading variation B (average value of B=B÷number of dark pixels). In that exponent function, y is the post-correction (output) value, x is the pre-correction (input) value, and the value of α varies according to the average value of B. If the average value of B is greater than Th1 (average value of B>Th1, where Th1 is a predetermined threshold value such as 10) (that is, if the shading variation for the dark portion is small), then the image correcting apparatus 10 calculates the correction curve for brightening as illustrated in (2) in FIG. 3 (for example, α=average value of −B÷110+1.1). On the other hand, if the average value of B is smaller than Th1 (average value of B<Th1) (that is, if the shading variation for the dark portion is small), then the image correcting apparatus 10 calculates the correction curve for darkening as illustrated in (1) in FIG. 3 (for example, α=average value of −B÷50+1.2).

(3) System Configuration

Meanwhile, the sequence of operations, the sequence of control, the particular naming, and the information including a variety of data or parameters (e.g., information on correction curves stored in the correction amount storing unit 11a illustrated in FIG. 2) in the abovementioned description or in the drawings may be arbitrarily changed unless otherwise stated.

Moreover, the constituent elements of the device illustrated in the drawings are merely conceptual, and need not be physically configured as illustrated. The constituent elements, as a whole or in part, may be separated, such as separating the correction amount calculating unit 12c into a correction amount calculating unit and an image correcting unit, or integrated either functionally or physically based on various types of loads or use conditions. Furthermore, the process functions performed by the device are entirely or partially realized by the CPU or computer programs that are analyzed and executed by the CPU, or realized as hardware by wired logic.

(4) Program

Figure 10:
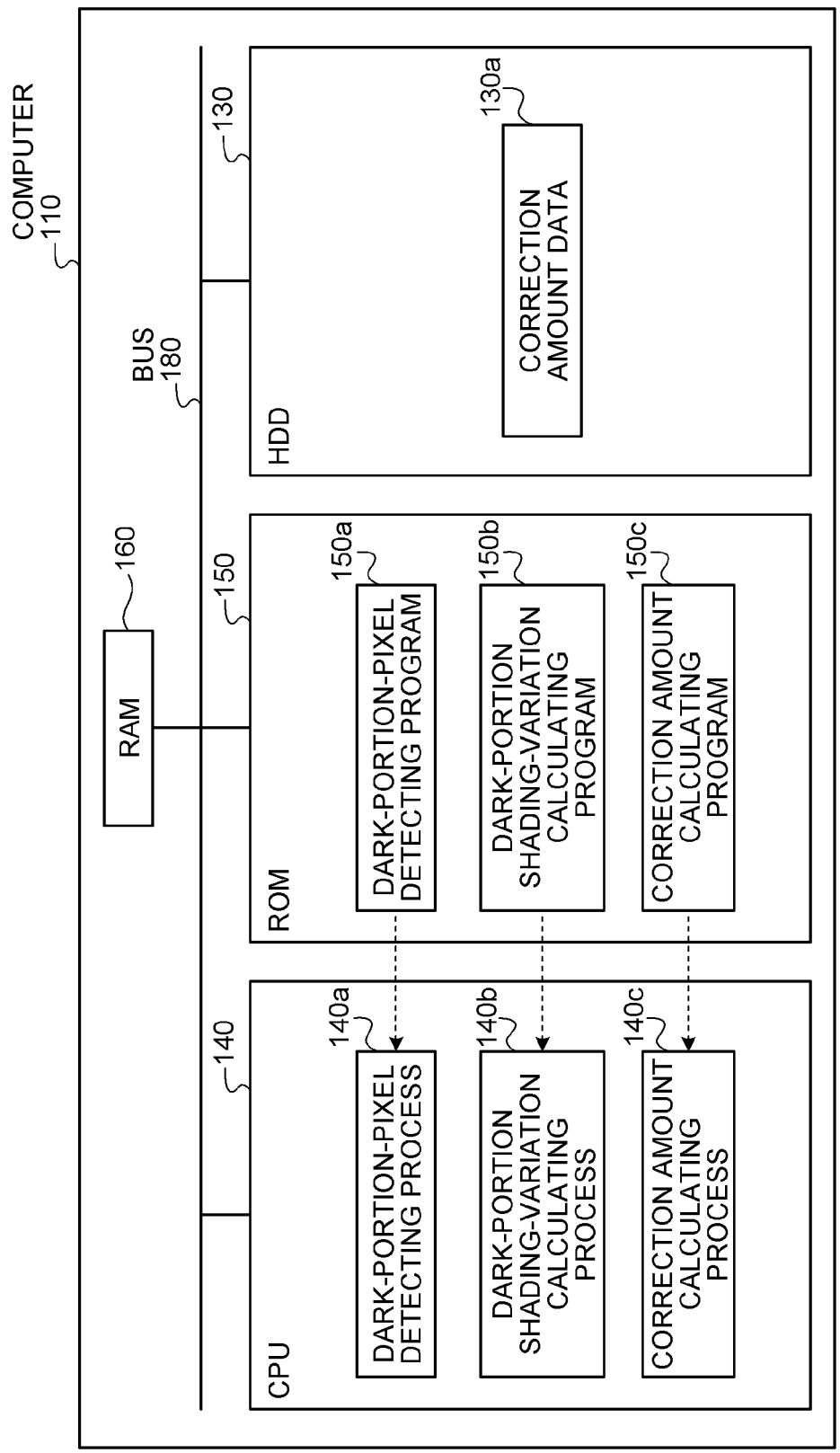
FIG. 10 is a schematic diagram of a computer that executes an image correcting program.

Meanwhile, the image processing apparatus described in the abovementioned embodiments may be implemented by executing, in a computer such as a personal computer or a workstation, a program written in advance. Given below is the description with reference to FIG. 10 of an exemplary computer that executes an image correcting program having identical functions to those of the image correction apparatus described in the abovementioned embodiments. FIG. 10 is a schematic diagram of a computer that executes an image correcting program.

As illustrated in FIG. 10, a computer 110 functioning as an image correcting apparatus includes a hard disk drive (HDD) 130, a central processing unit (CPU) 140, a read only memory (ROM) 150, a random access memory (RAM) 160, and a bus 180 that interconnects the abovementioned constituent elements.

In the ROM 150 is stored in advance an image correcting program having identical functions to those of the image correcting apparatus 10 according to the first embodiment. That is, as illustrated in FIG. 10, in the ROM 150 are stored in advance a dark-portion pixel detecting program 150a, a dark-portion shading-variation calculating program 150b, and a correction amount calculating program 150c. The programs 150a to 150c may be appropriately separated or integrated in an identical manner to the constituent elements of the image correcting apparatus 10 illustrated in FIG. 2.

The CPU 140 reads the programs 150a to 150c from the ROM 150 and executes them so that, as illustrated in FIG. 10, the programs 150a to 150c respectively function as a dark-portion-pixel detecting process 140a, a dark-portion shading-variation calculating process 140b, and a correction amount calculating process 140c. The processes 140a to 140c respectively correspond to the dark-portion-pixel detecting unit 12a, the dark-portion shading-variation calculating unit 12b, and the correction amount calculating unit 12c illustrated in FIG. 2.

Then, based on correction amount data 130a recorded in the HDD 130, the CPU 140 executes the image correction program.

Meanwhile, the programs 150a to 150c need not be stored in the ROM 150 from the start. Alternatively, for example, it is possible to store those programs in a portable physical medium, which may be inserted into the computer 110 as a computer-readable storage medium, such as a flexible disk (FD), a compact disk read only memory (CD-ROM), a digital versatile disk (DVD), a magnetic optical disk, or a chip card; in a fixed physical medium as a computer-readable storage medium such as an HDD installed inside or outside of the computer 110; or in another computer (or server) that is connected to the computer 110 via a public line, Internet, a local area network (LAN), or a wide area network (WAN). The computer 110 may then read those stored programs and execute the same.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image correcting apparatus for performing correction according to a feature of an input image, the image correcting apparatus comprising:

an image shading determining unit that calculates a feature value of average luminance from the pixel value of each pixel in the input image and determines whether the input image is a dark image based on whether the calculated feature value of the input image is equal to or smaller than a second threshold value;

a dark-portion-pixel detecting unit that detects, from each pixel of the input image, a pixel having corresponding pixel value equal to or smaller than the first threshold value corresponding to darker luminance than the luminance corresponding to the second value when the input image is determined to be the dark image by the image shading determining unit;

a dark-portion shading-variation calculating unit that calculates, for each pixel that is detected by the dark-portion-pixel detecting unit to be a dark pixel having corresponding pixel value equal to or smaller than the first threshold value, a shading variation between the dark pixel and corresponding surrounding pixel; and a correction amount calculating unit that calculates a correction amount based on the shading variation calculated by the dark-portion shading-variation calculating unit and performs image correction with the correction amount.

2. The image correcting apparatus according to claim 1, wherein, for each pixel that is detected by the dark-portion-pixel detecting unit to be a dark pixel, the dark-portion shading-variation calculating unit calculates a shading variation between the dark pixel and corresponding surrounding pixel using a high-pass filter.

3. The image correcting apparatus according to claim 1, wherein, when the shading variation calculated by the dark-portion shading-variation calculating unit is equal to or smaller than a third threshold value, the correction amount calculating unit calculates a correction amount for image darkening and performs image correction, and, when the shading variation calculated by the dark-portion shading-variation calculating unit is greater than the third threshold value, the correction amount calculating unit calculates a correction amount for image brightening and performs image correction.

4. The image correcting apparatus according to claim 1, further comprising a correction amount storing unit that storing therein, in a corresponding manner to the shading variation calculated by the dark-portion shading-variation calculating unit, a plurality of correction curves used in correction amount determination, wherein the correction amount calculating unit that obtains, from the correction amount storing unit, a correction amount corresponding to the shading variation calculated by the dark-portion shading-variation calculating unit and performs image correction with the obtained correction amount.

5. A non-transitory computer-readable storage medium that stores therein an image correcting program for performing correction according to a feature of an input image, the image correcting program causing a computer to execute a process comprising:

calculating a feature value of average luminance from the pixel value of each pixel in the input image;

determining whether the input image is a dark image based on whether the calculated feature value of the input image is equal to or smaller than a second threshold value;

detecting, from each pixel of the input image, a pixel having corresponding pixel value equal to or smaller than the first threshold value corresponding to darker luminance than the luminance corresponding to the second value when the input image is determined to be the dark image;

calculating, for each pixel that is detected at the detecting to be a dark pixel having corresponding pixel value equal to or smaller than the first threshold value, a shading variation between the dark pixel and corresponding surrounding pixel; and calculating a correction amount based on the shading variation calculated at the calculating the shading variation and performing image correction with the correction amount.

6. The non-transitory computer-readable storage medium according to claim 5, wherein the calculating the shading variation includes calculating, for each pixel that is detected at the detecting the pixel to be a dark pixel, a shading variation between the dark pixel and corresponding surrounding pixel using a high-pass filter.

7. The non-transitory computer-readable storage medium according to claim 5, wherein the calculating the correction amount includes calculating a correction amount for image darkening and performing image correction when the shading variation calculated at the calculating shading variation is equal to or smaller than a third threshold value, and calculating a correction amount for image brightening and performing image correction when the shading variation calculated at the calculating shading variation is greater than the third threshold value.

8. The non-transitory computer-readable storage medium according to claim 5, the process further comprising storing a plurality of correction curves used in correction amount determination in a correction amount storing unit, in a corresponding manner to the shading variation calculated at the calculating the shading variation, wherein the calculating the correction amount includes obtaining, from the correction amount storing unit, a correction amount corresponding to the shading variation calculated at the calculating the shading variation, and performing image correction with the obtained correction amount.

9. An image correcting method for performing correction according to a feature of an input image, the image correcting method comprising:

calculating a feature value of average luminance from the pixel value of each pixel in the input image;

determining whether the input image is a dark image based on whether the calculated feature value of the input image is equal to or smaller than a second threshold value;

detecting, from each pixel of the input image, a pixel having corresponding pixel value equal to or smaller than the first threshold value corresponding to darker luminance than the luminance corresponding to the second value when the input image is determined to be the dark image;

calculating, for each pixel that is detected at the detecting to be a dark pixel having corresponding pixel value equal to or smaller than the first threshold value, a shading variation between the dark pixel and corresponding surrounding pixel; and calculating a correction amount based on the shading variation calculated at the calculating the shading variation and performing image correction with the correction amount.

10. The image correcting method according to claim 9, wherein the calculating the shading variation includes calculating, for each pixel that is detected at the detecting the pixel to be a dark pixel, a shading variation between the dark pixel and corresponding surrounding pixel using a high-pass filter.

11. The image correcting method according to claim 9, wherein the calculating the correction amount includes calculating a correction amount for image darkening and performing image correction when the shading variation calculated at the calculating shading variation is equal to or smaller than a third threshold value, and calculating a correction amount for image brightening and performing image correction when the shading variation calculated at the calculating shading variation is greater than the third threshold value.

12. The image correcting method according to claim 9, further comprising storing a plurality of correction curves used in correction amount determination in a correction amount storing unit, in a corresponding manner to the shading variation calculated at the calculating the shading variation, wherein the calculating the correction amount includes obtaining, from the correction amount storing unit, a correction amount corresponding to the shading variation calculated at the calculating the shading variation, and performing image correction with the obtained correction amount.

* * * * *